(12) United States Patent
Pratt et al.

(10) Patent No.: US 8,060,043 B2
(45) Date of Patent: Nov. 15, 2011

(54) ADAPTIVE IIP2 CALIBRATION

(75) Inventors: Patrick Pratt, Mallow (IE); Charles LeRoy Sobchak, Davie, FL (US)

(73) Assignee: Freescale Semiconductor, Austin, TX (US)

( * ) Notice: Subject to any disclaimer, the term of this patent is extended or adjusted under 35 U.S.C. 154(b) by 465 days.

(21) Appl. No.: 12/248,421

(22) Filed: Oct. 9, 2008

(65) Prior Publication Data

US 2010/0093298 A1 Apr. 15, 2010

(51) Int. Cl.
*H04B 1/06* (2006.01)
(52) U.S. Cl. .............. 455/234.1; 455/260; 455/334; 375/345
(58) Field of Classification Search .............. 455/230, 455/232.1, 234.1, 255–260, 323, 334; 375/345
See application file for complete search history.

(56) References Cited

U.S. PATENT DOCUMENTS

| | | | |
|---|---|---|---|
| 5,943,362 A * | 8/1999 | Saito | 375/143 |
| 6,990,137 B2 * | 1/2006 | Smee et al. | 375/142 |
| 7,058,364 B2 * | 6/2006 | Atkinson et al. | 455/76 |
| 7,139,543 B2 | 11/2006 | Shah | |
| 7,203,472 B2 | 4/2007 | Seppinen et al. | |
| 7,259,569 B2 | 8/2007 | Kim | |
| 7,295,813 B2 * | 11/2007 | Haub et al. | 455/67.13 |
| 7,433,384 B2 * | 10/2008 | Smee et al. | 375/142 |
| 2003/0186664 A1 | 10/2003 | Shah | |
| 2005/0143044 A1 | 6/2005 | Kim | |
| 2006/0094386 A1 | 5/2006 | Darabi et al. | |
| 2006/0160510 A1 | 7/2006 | Seppinen et al. | |
| 2006/0234664 A1 | 10/2006 | Chiu et al. | |
| 2007/0173220 A1 | 7/2007 | Kim et al. | |
| 2007/0190959 A1 | 8/2007 | Kim et al. | |
| 2008/0009258 A1 | 1/2008 | Safarian et al. | |
| 2008/0039045 A1 | 2/2008 | Filipovic et al. | |
| 2008/0116902 A1 | 5/2008 | Kim et al. | |
| 2008/0182537 A1 | 7/2008 | Manku et al. | |

OTHER PUBLICATIONS

PCT/US2009/056881 International Search Report and Written Opinion mailed Apr. 27, 2010.
Kahrizi et al., Adaptive Filtering Using LMS for Digital TX IM2 Cancellation in WCDMA Receiver, Skyworks Solution Inc., pp. 519-522, 1-4244-1463-6/08 ©2008 IEEE, RSW 2008.
Aparin et al., An Integrated LMS Adaptive Filter of TX Leakage for CDMA Receiver Front Ends, IEEE Journal of Solid-State Circuits, 0018-9200/©2006 IEEE, May 2006, 12 pages, vol. 41, No. 5.
Dufrêne & Weigel, Adaptive IP2 calibration scheme for direct-conversion receivers, Institute for Electronics Engineering, University of Erlangen-Nuremberg, 0-7803-9412-7/06/©2006 IEEE, pp. 111-114, Erlangen, Germany.
Safarian et al., Integrated Blocker Filtering RF Front Ends, 2007 IEEE Radio Frequency Integrated Circuits Symposium, Jun. 3-5, 2007, pp. 13-16, 1-4244-0530-0/1-4244-0531-9/07, ©2007 IEEE.

* cited by examiner

*Primary Examiner* — Nhan Le (57) ABSTRACT

A radio frequency transceiver (102), including a transmitter (104), a duplexer (108) and a direct-conversion receiver (106) including a mixer (140 and 141). An IIP2 calibration system (170), coupled to the transceiver, includes an IIP2 coefficient estimator (172) for calculating an estimate of second-order distortion intermodulation distortion, and an IIP2 controller (174) for adjusting an IIP2 tuning port of the mixer in the receiver to minimize second-order distortion intermodulation distortion in the receiver that may be caused by the receiver receiving a transmit RF signal leaking through the duplexer.

15 Claims, 5 Drawing Sheets

ADAPTIVE IIP2 CALIBRATION

BACKGROUND OF THE INVENTION

1. Field of the Invention

This invention relates generally to radio frequency receivers, and more specifically to reducing second-order intermodulation distortion in a direct-conversion receiver.

2. Related Art

A radio frequency (RF) receiver uses the frequency response of a low noise amplifier (LNA), a surface acoustic wave (SAW) filter and a duplexer to attenuate signals that are far from a center frequency of the receiver sufficiently enough to not corrupt a desired signal. If the LNA and the SAW filter are removed from the analog line-up of the receiver, problems that can detrimentally affect the performance of the receiver may arise. In a transceiver, which comprises a transmitter and a receiver, one such problem is a signal transmitted by the transmitter leaking into the receiver. In a transceiver having only a duplexer to isolate the receiver from the transmitter, there is considerably less attenuation in the receiver of signals at the transmit frequency. A receiver that lacks a SAW filter requires additional and/or tighter constraints on the second-order intercept point (IP2) of the mixer. Without a sufficiently high IP2 of the mixer, the presence of second-order intermodulation distortion (IMD2) substantially reduces the sensitivity of the receiver. The IMD2 results from an unwanted squaring of the transmitted signal at the mixer of the receiver.

Most cellular wireless transceivers use a direct-conversion receiver because a high level of integration can be obtained. However, a direct-conversion receiver requires a high input-related second-order intercept point (IIP2), which is the theoretical input level at which the power of the IMD2 products are equal in power to the power of a desired signal.

When the receiver is at sensitivity and the transmitter is at maximum output power, the self-blocking effect of the transmitter can, through a second-order nonlinearity of the mixer, desensitize the receiver. In such a receiver, transmitted signals are attenuated via the duplexer by approximately 50 dB; nevertheless, attenuated transmitted signals leak into the receive signal path prior to a front-end amplifier. For example, in the receiver, the duplexer attenuates a strong signal, transmitted by the transmitter of the transceiver, of +25 dBm (316 milliwatts) located at 190 MHz from the center frequency by only 50 dB, thus resulting in a signal of −25 dBm (3.16 μwatts) at the input of the front-end amplifier. This −25 dBm signal creates strong IMD2 products that land on the desired signal, thus producing interference.

The IP2 of the mixer in a direct-conversion receiver that lacks a SAW can vary due to manufacturing processes and/or change in temperature. Any mismatch between differential signals in the mixer causes a reduction in the IP2 from an optimal IP2. The mismatch can be due to variations in manufacturing processes or due to temperature changes during operation of the receiver, or due to both causes. The mismatch can also occur due to direct current (DC) offset, local oscillator leakage, or other factors. When there is a large mismatch between differential signals in the mixer, a worst case IP2 of approximately 25 dBm can occur. The following example uses the worst case IP2 of 25 dBm from measured data of a known 3G receiver.

$$IMD2 = P_{in} - (IP_2 - (P_{in})) = -25 - (25 - (-25)) = -75$$
$$dBm = 3.16 \; \mu watts$$

When a transmit signal is at maximum power, 25 dBm, the IMD2 referred to the input of a transconductance amplifier (not shown) is −75 dBm. The received power spectral density, Ior, as per the sensitivity specification set forth in the 3rd Generation Partnership Project (3GPP) standard, should be at or below −106.7 dBm to achieve a 0.1% bit error rate. The thermal noise, kTBF, in this example is approximately −99 dBm. Because the power of the IMD2 over the bandwidth of the desired signal is much greater than the kTBF, the sensitivity rises to −82.7 dB, i.e., 24 dB above the required sensitivity. Therefore, a receiver, including, in particular, a direct-conversion receiver that lacks a SAW, should have a sufficiently large IP2 to meet the specifications of the 3GPP standard.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE EXEMPLARY EMBODIMENT

Figure 1:
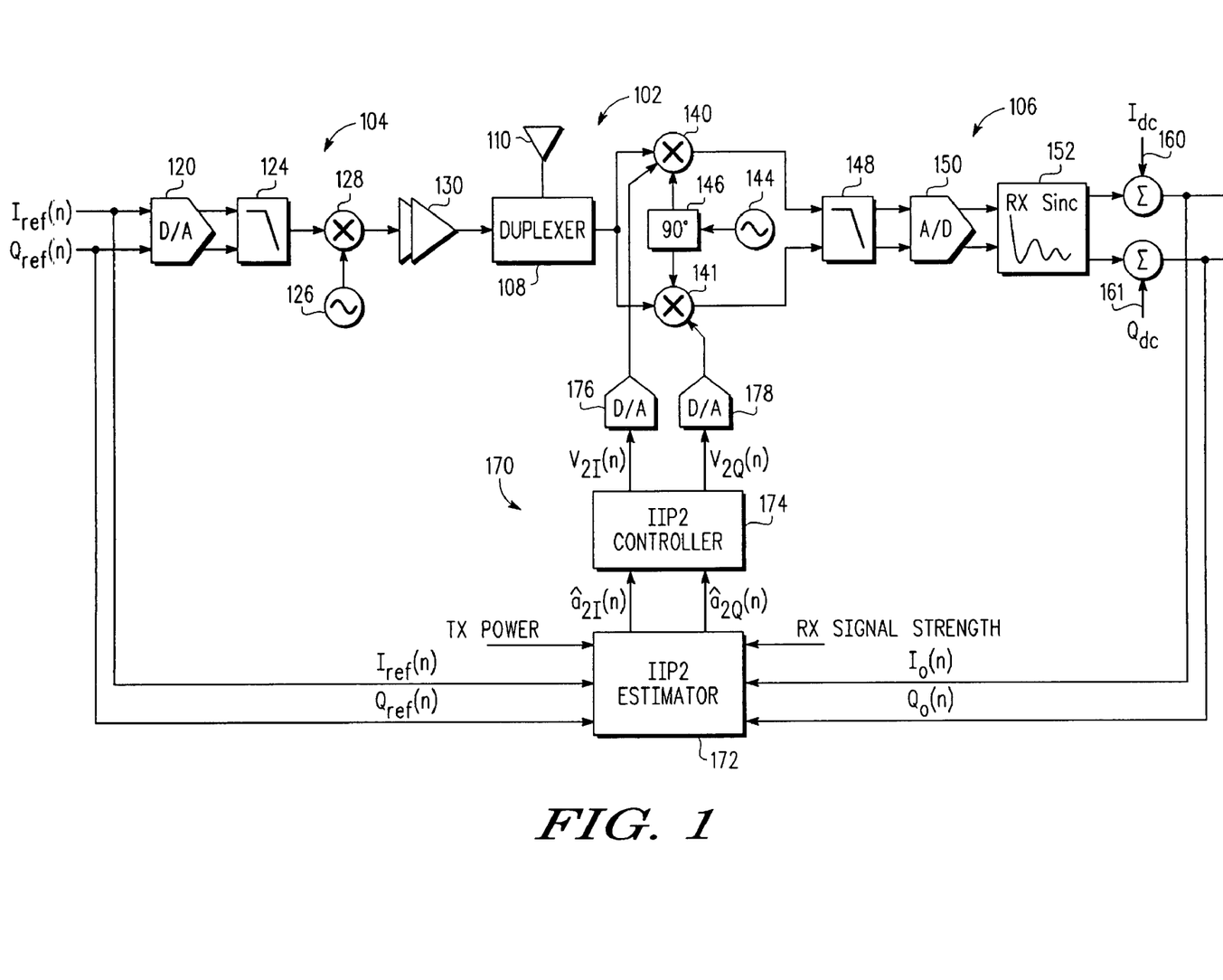
FIG. 1 illustrates a simplified functional block diagram of portions of a direct-conversion transceiver and a simplified functional block diagram of an IIP2 calibration system that includes an estimator and a controller.

FIG. 1 illustrates a simplified functional block diagram of portions of a direct-conversion transceiver 102 that includes a portion of a transmitter 104 and a portion of a receiver 106. The transmitter 104 and the receiver 106 share a duplexer 108 and an antenna 110. The transmitter 104 includes a reference transmit baseband signal comprising an I-channel reference signal $I_{ref}$ and a Q-channel reference signal $Q_{ref}$ outputted from another portion (not shown) of the transmitter. The I-channel reference signal $I_{ref}$ and the Q-channel reference signal $Q_{ref}$ are fed into a respective digital-to-analog (D/A) converter 120. For simplicity of illustration, only one schematic symbol is shown in FIG. 1 for the D/A converter 120 and for several other components that occur in pairs in the I-channel and Q-channel signal paths of the transmitter 104 and the receiver 106. The output from the D/A converter 120 is fed into an analog lowpass filter 124. The transmitter includes a transmit oscillator 126. The output from the lowpass filter 124, which is at baseband, is multiplied with an output from the transmit oscillator 126 at a mixer 128. The output from the mixer 128 is amplified by a power amplifier 130. The output from the power amplifier 130 is a transmitted radio frequency (RF) signal that is fed into the antenna 110 through the duplexer 108.

The receiver 106 is coupled to the antenna 110 through the duplexer 108. To a limited extent, the duplexer 108 isolates the receiver 106 and the transmitter 104. In an exemplary embodiment, the duplexer 108 provides approximately 50 dB of isolation. A received RF signal is fed into an I-channel mixer 140 and a Q-channel mixer 141. The received RF signal is at a different frequency from the transmitted RF frequency. In an exemplary embodiment, the frequency of the received RF signal and the frequency of the transmitted RF signal are separated by approximately 45-180 MHz, depending upon the frequency band. In an exemplary embodiment, the transceiver 102 operates in one or more frequency bands between approximately 800 MHz and approximately 2 GHz. In an exemplary embodiment, the transceiver 102 transmits and receives a spread-spectrum modulated RF signal, such as a signal compatible with a wideband code division multiple access (WCDMA) protocol. The receiver 106 includes a receive oscillator 144 coupled directly to the I-channel mixer 140 and coupled to the Q-channel mixer 141 via a phase shifter 146 that shifts the signal going to the Q-channel mixer 141 by 90°. The signals outputted from each mixer 140 and 141 are at baseband, and the output from each mixer is coupled to a respective analog lowpass filter 148.

In addition to a desired component downconverted to baseband from a desired received RF signal, the signal outputted by the I-channel mixer 140 and the Q-channel mixer 141 may also have components at other frequencies as a result of non-linearities in the mixers, such as an undesired, problematic component downconverted to baseband from a RF signal transmitted by the transmitter 104 and leaked into the receiver 106 through the duplexer 108. The undesired, problematic signal is downconverted to baseband as a result of a second-order nonlinearity in the mixer 140 and 141. Any component at baseband other than the component downconverted from the desired, receive signal detrimentally raises the noise figure of the receiver 106.

In general, the output z(t) of a nonlinear device can be represented as follows:

$$z(t) = a_1 s(t) - a_2 s^2(t) - a_3 s^3(t) - a_4 s^4(t) - a_5 s^5(t) \quad (1)$$

where s(t) is the signal at the input of the nonlinear device, and $a_N$ are dimensionless gain terms associated with the nonlinear device. If all nonlinearities higher than second-order are ignored, the above equation becomes, $$z(t) = a_1 s(t) - a_2 s^2(t) \quad (2)$$

where $a_2 s^2(t)$ represents a second-order intermodulation distortion product.

The output $y_I(t)$ of I-channel mixer 140 and the output $y_Q(t)$ of the Q-channel mixer 141 may include a second-order intermodulation distortion product caused by a second-order nonlinearity in the mixers. Therefore, the I-channel mixer 140 is a nonlinear device, and its output $y_I(t)$ can be represented as follows (if all the nonlinearities higher than second-order are ignored):

$$y_I(t) = a_{1I} s_I(t) - a_{2I} s_I^2(t) \quad (3)$$

The actual I-channel mixer 140, which is a nonlinear device, can be modeled as an ideal mixer receiving an input signal $I_{ref} \cos \omega_{tx} t$ that is multiplied with a receive oscillator signal $\cos \omega_{rx} t$. The output of the ideal mixer has no second-order or higher nonlinearities; therefore, the output of the ideal mixer is $(I_{ref} \cos \omega_{tx} t)(\cos \omega_{rx} t)$. The model further includes adding the second-order intermodulation distortion product $a_{2I} s_I^2(t)$ to the output of the ideal mixer, so that the output of the actual mixer becomes $(I_{ref} \cos \omega_{tx} t)(\cos \omega_{rx} t) + a_{2I} s_I^2(t)$.

It can be shown also that the second-order intermodulation distortion product for the I-channel mixer is $$y_{2I}(t) = a_{2I} s_I^2(t) = |x(t) \cos(\omega_{rx} t + \phi_0)|^2 = |A_{ref} \cos(\omega_{tx} t + \phi_{ref}) \cos(\omega_{rx} t + \phi_0)|^2 \quad (4)$$

The signal x(t) that is transmitted by the transmitter 104, which may be leaked into the receiver 106 through the duplexer 108, can be represented as:

$$x(t) = I_{ref} \cos(\omega_{tx} t) + Q_{ref} \sin(\omega_{tx} t) \quad (5)$$

Alternatively, it can be represented as:

$$x(t) = A_{ref} \cos(\omega_{tx} t + \phi_{ref}) \quad (6)$$

At the I-channel mixer 140 in the receiver 106, x(t) is multiplied by a signal $\cos(\omega_{rx} t + \phi_0)$ from the receive oscillator 144; therefore, for the I-channel mixer, $$s_I = x(t) \cos(\omega_{rx} t + \phi_0) \quad (7)$$

After substituting equation (5) into equation (7), yields $$s_I = (I_{ref} \cos(\omega_{tx} t) + Q_{ref} \sin(\omega_{tx} t)) \cos(\omega_{rx} t + \phi_0) \quad (8)$$

Performing the multiplication indicated in equation (8), yields the following equation (9):

$$s_I(t) = \frac{I_{ref}}{2} \cos((\omega_{tx} - \omega_{rx})t - \phi_0) + \frac{I_{ref}}{2} \cos((\omega_{tx} + \omega_{rx})t + \phi_0) + \frac{Q_{ref}}{2} \sin((\omega_{tx} + \omega_{rx})t + \phi_0) - \frac{Q_{ref}}{2} \sin((\omega_{rx} - \omega_{tx})t + \phi_0)$$

If there were no second-order intermodulation distortion products produced in the I-channel mixer 140, the output of the mixer would be:

$$y_{1I}(t) = a_{1I} s_I(t) \quad (10)$$

However, second-order intermodulation distortion products may be produced in the I-channel mixer 140, in which case the output of the mixer would include a second-order intermodulation distortion product. The output of the second-order intermodulation distortion product, alone, from the I-channel mixer 140 can be represented as follows:

$$y_{2I}(t) = a_{2I} s_I^2(t) \quad (11)$$

Substituting equation (9) into equation (11) yields the following equation (12), $$y_{2I}(t) = a_{2I} \left( \begin{array}{c} \frac{I_{ref}}{2} \cos((\omega_{tx} - \omega_{rx})t - \phi_0) + \\ \frac{I_{ref}}{2} \cos((\omega_{tx} + \omega_{rx})t + \phi_0) + \\ \frac{Q_{ref}}{2} \sin((\omega_{tx} + \omega_{rx})t + \phi_0) - \\ \frac{Q_{ref}}{2} \sin((\omega_{rx} - \omega_{tx})t + \phi_0) \end{array} \right)^2$$

Performing the indicated squaring operation in the above equation, and removing all cross terms because they result in higher frequency terms that will be filtered out by the analog filter 148, yields the following equation (13), $$y_{21}(t) = a_{2I} \begin{pmatrix} \frac{I_{ref}^2}{4}(\cos((\omega_{tx}-\omega_{rx})t-\phi_0))^2 + \\ \frac{I_{ref}^2}{4}(\cos((\omega_{tx}+\omega_{rx})t+\phi_0))^2 + \\ \frac{Q_{ref}^2}{4}(\sin((\omega_{tx}+\omega_{rx})t+\phi_0))^2 + \\ \frac{Q_{ref}^2}{4}(\sin((\omega_{tx}+\omega_{rx})t+\phi_0))^2 \end{pmatrix}$$

Removing the double-angle terms after squaring, and saving only the terms located at or near DC, from equation (13) yields, $$y_{2I}(t) = a_{2I}\left(\frac{I_{ref}^2}{8} + \frac{I_{ref}^2}{8} + \frac{Q_{ref}^2}{8} + \frac{Q_{ref}^2}{8}\right) \quad (14)$$

$$= a_{2I}\left(\frac{I_{ref}^2}{4} + \frac{I_{ref}^2}{4}\right)$$

$$y_{2I}(t) = a_{2I}\left(\frac{I_{ref}^2 + Q_{ref}^2}{4}\right) \quad (15)$$

$$= \frac{a_{2I}}{4}A_{ref}^2$$

In a similar fashion, it can be shown that $$y_{2Q}(t) = a_{2Q}\left(\frac{I_{ref}^2 + Q_{ref}^2}{4}\right) \quad (16)$$

$$= \frac{a_{2Q}}{4}A_{ref}^2$$

Therefore, the total in-band second-order distortion product, $y_2(t)$, of the receiver 106 can be written as follows:

$$IMD2_I = y_2(t) \quad (17)$$

$$= y_{2I}(t) + jy_{2Q}(t)$$

$$= \frac{(a_{2I} + ja_{2Q})}{4}(I_{ref}^2 + Q_{ref}^2)$$

$$= \frac{a_{2I} + ja_{2Q}}{4}A_{ref}^2$$

$$= \frac{a_2}{4}A_{ref}^2$$

where $a_2 = a_{2I} + a_{2Q}$.

At the IIP2 intersection, $s(t) = V_{iip2}$, and the following equations hold:

$$y_{1I}(t) = a_{1I}s_I(t) = y_{2I}(t) = a_{2I}s_I^2(t) \quad (18)$$

$$a_{1I} = a_{2I}A_{iip2I\_v} \quad (19)$$

If the IIP2 is measured in $V_{rms}$, then the following equation holds (with $a_{1I}$ being the linear gain of the I-channel mixer 140).

$$a_{2I} = \frac{a_{1I}}{\sqrt{2}\,A_{iip2I\_vrms}} \quad (20)$$

If the IIP2 were measured in decibels $V_{rms}$, then $a_{2I}$ could be expressed as follows:

$$a_{2I} = \frac{a_{1I}}{\sqrt{2}}10^{-\frac{IIP2_I}{20}} \quad (21)$$

In a similar fashion, it can be shown that $a_{2Q}$ can be expressed as follows:

$$a_{2Q} = \frac{a_{1Q}}{\sqrt{2}}10^{-\frac{IIP2_Q}{20}} \quad (22)$$

Therefore, minimizing the value of $a_{2I}$ and $a_{2Q}$ is equivalent to maximizing the value of $IIP2_I$ and $IIP2_Q$, respectively, in the receiver 106. Maximizing the IIP2 minimizes the IMD2.

The output from each lowpass filter 148 is fed into a sigma-delta digital-to-analog (D/A) converter 150. The output from each D/A converter 150 is fed into a decimation filter 152, which acts as a lowpass filter. In one embodiment, the decimation filter 152 is a sinc filter or a series of multi-rate filters. In another embodiment, the decimation filter 152 is a root raised cosine filter. The output from each decimation filter 152 is an $I_o(n)$ and a $Q_o(n)$ signal, respectively. The $I_o(n)$ signal and the $Q_o(n)$ signal include an $I_{dc}$ signal 160 and a $Q_{dc}$ signal 161, respectively. The $I_{dc}$ signal 160 and the $Q_{dc}$ signal 161 are direct current (DC) offsets that are produced in the receiver 106 at various points in the receiver because of non-idealities in the receiver. The $I_{dc}$ signal 160 and the $Q_{dc}$ signal 161 may include residual DC offsets that are produced by effects, such as a common-mode effects, that are unrelated to the DC produced as a result of the second-order nonlinearity in the mixers 140 and 141. In FIG. 1, the $I_{dc}$ signal 160 and the $Q_{dc}$ signal 161 are shown as being inserted into the receive path at a single point as a simplified idealization. Although the majority of the DC contributions occur in the analog section of the receiver 106, and thus the DC could be extracted prior to the A/D converter 150; it is, nevertheless, mathematically accurate to apply the DC after the A/D converter, where $I_{dc} = I_{dc\_analog}$ (potentially quantized). The baseband signal in the receiver 106 after the decimation filter 152 can be represented as $I_o(n) + jQ_o(n)$, and this signal is fed into a demodulator (not shown).

The baseband signal in the receiver 106 after the decimation filter 152 can be further represented as follows:

$$I_o(n)+jQ_o(n)=\{a_{2I}+ja_{2Q}\}G_{tx\_rx}|A_{ref}(n-D)|^2+I_{dc}+jQ_{dc}+w_I(n)+jw_Q(n) \quad (23)$$

where $\{a_{2I}+ja_{2Q}\}$ represents IIP2 coefficients; $G_{tx\_rx}$ represents a linear gain from baseband in the transmitter 104 to baseband in the receiver 106; $|A_{ref}(n-D)|^2$ represents an amplitude squared of the reference transmit baseband signal; D represents a propagation delay of a signal from baseband in the transmitter 104 to baseband in the receiver 106; the term $I_{dc}+jQ_{dc}$ represents DC offsets; and the term $w_I(n)+jw_Q(n)$ represents residual noise, which includes the desired receive signal, blockers, circuit noise and numerical noise. However, the term "blockers", as used in the preceding sentence, does not include the transmit signal self-blocker at 3.84 MHz. For the reference sensitivity level specified in Technical Specification 25.101 of the 3GPP standard, the worst case blocker, −49 dBm at 3.25 MHz, occurs when a CDMA signal (for example, Interim Standard 95, which has 1.2288 Mchips per second) interferes with the 3GPP signal being received by the receiver 106. Other examples of blockers include adjacent channel interference and co-channel interference. It can be shown that the IIP2 coefficients, $a_{2I}$ and $a_{2Q}$, are proportional to the cross correlation between the received signal and the amplitude squared of the transmit signal. It can be shown also that the IIP2 coefficients, $a_{2I}$ and $a_{2Q}$, are proportional to the second-order intermodulation distortion occurring in the mixer 140 and 141, respectively. The value of D is determined for each different design of a transceiver 102, and then remains constant for all copies of each such different design. The value of $G_{tx\_rx}$ depends upon transmit power out, $P_{OUT}$, of the transmitter 104, the amount of isolation provided by the duplexer 108, and a setting of an automatic gain control (AGC) of the receiver 106. More precisely, $G_{tx\_rx}$ is an estimate of the linear gain from a baseband portion of the transmitter 104 through the transmitter, through the duplexer 108, and to the receiver 106 from its front end to its baseband portion. Furthermore, it can be shown that $$G_{tx\_rx} = G_{tx}^2 G_{dx}^2 G_{rx} \tag{24}$$

where $G_{tx}$ is a gain from the baseband portion of the transmitter 104 to the duplexer 108, $G_{dx}$ is a gain of, or the degree of isolation afforded by, the duplexer 108, and $G_{rx}$ is a gain from the front end of the receiver 106 to its baseband portion.

FIG. 1 also illustrates a simplified functional block diagram of an adaptive IIP2 calibration system 170 (hereinafter "calibration system") that includes an IIP2 estimator (hereinafter "estimator") 172, an IIP2 nonlinear controller (hereinafter "controller") 174 operatively coupled to the estimator, and D/A converters 176 and 178 operatively coupled to the mixers 140 and 141, respectively, and to the controller. Input signals to the estimator 172 include $I_{ref}$ and $Q_{ref}$ signals from the baseband portion of the transmitter 104; $I_o$ and $Q_o$ signals from the baseband portion of the receiver 106; a TX_POWER signal obtained from an automatic output controller (AOC) of the transmitter 104, whose value is indicative of the power of the signal transmitted by the transmitter 104; and a RX_POWER, or received signal strength indication (RSSI) obtained from the AGC of the receiver, whose value is indicative of the strength of the signal received by the receiver measured at baseband before any baseband amplifier. The RSSI may contain only the power associated with the bandwidth necessary for the desired received signal or the RSSI may contain the power associated with a wider bandwidth to allow for adjacent channels to be estimated. In one embodiment, the RSSI contains an estimate of the power over the same bandwidth as seen at the output of the decimation filter 152. The estimator 172 outputs to the controller 174 an $\hat{a}_{2I}$ signal and an $\hat{a}_{2Q}$ signal, which are estimates of the IIP2 in the I-channel and the Q-channel, respectively The controller 174 outputs a tuning signal $v_{2I}$ and a tuning signal $v_{2Q}$, whose values are converted, at the D/A converters 176 and 178, to analog voltages used for tuning the mixers 140 and 141, respectively, to counteract any second-order intermodulation distortion that may be otherwise occurring in the mixers. The controller 174 adjusts the IIP2 tuning voltages $v_{2I}$ and $v_{2Q}$ to minimize the IIP2 coefficients $a_{2I}$ and $a_{2Q}$, respectively. In an exemplary embodiment, the D/A converters 176 and 178 operate at approximately 96 MHz. Advantageously, the calibration system 170 is usable during normal receive operation of the receiver 106.

The calibration system 170 is a closed-loop, digital, adaptive, self-calibrating, on-line method for optimally tuning the IIP2 setting so as to minimize the second-order nonlinearity of the receiver 106. The calibration system 170 compares an original transmitted signal (as it appears at baseband in the transmitter 102) with a received signal (as it subsequently appears at baseband in the receiver 106). The amplitude squared of the transmitted signal is used as a reference source to estimate a level of correlation between the received signal (as it appears at baseband in the receiver) and the original transmitted signal (as it appeared at baseband in the transmitter) that is then transmitted as an RF signal by the transmitter 104 and that blocks, or jams, the receiver 106 due to second-order mixing. The amplitude squared of the original transmitted signal is used as a reference source because the transmit signal that falls into the receive band (at baseband) in the receiver 106 due to second-order mixing is proportional to the amplitude squared of the original transmitted signal. The level of correlation is a measure of the amount of the transmit signal that falls into the receive band (at baseband) in the receiver 106 due to second-order mixing. The level of correlation is used as a measure of the second-order nonlinearity of the receiver 106. The desired receive signal also falls into the receive band (at baseband) in the receiver 106; however, this occurs because of first-order mixing. The controller 174 adjusts the IIP2 setting of the receiver 106 to drive $\hat{a}_{2I}$ and $\hat{a}_{2Q}$ to as close to zero as it can. The calibration system 170 uses a "live" signal, or self-blocker transmitted by the transmitter 104, as a training signal to drive the calibration algorithm. The calibration system 170 tunes the receiver 106 for maximum IIP2 in the presence of temperature drift. Because the calibration system 170 operates on-line, it can dynamically track out IIP2 temperature variations during normal operation of the transceiver 102 including during normal receive operation of the receiver 106.

Figure 2:
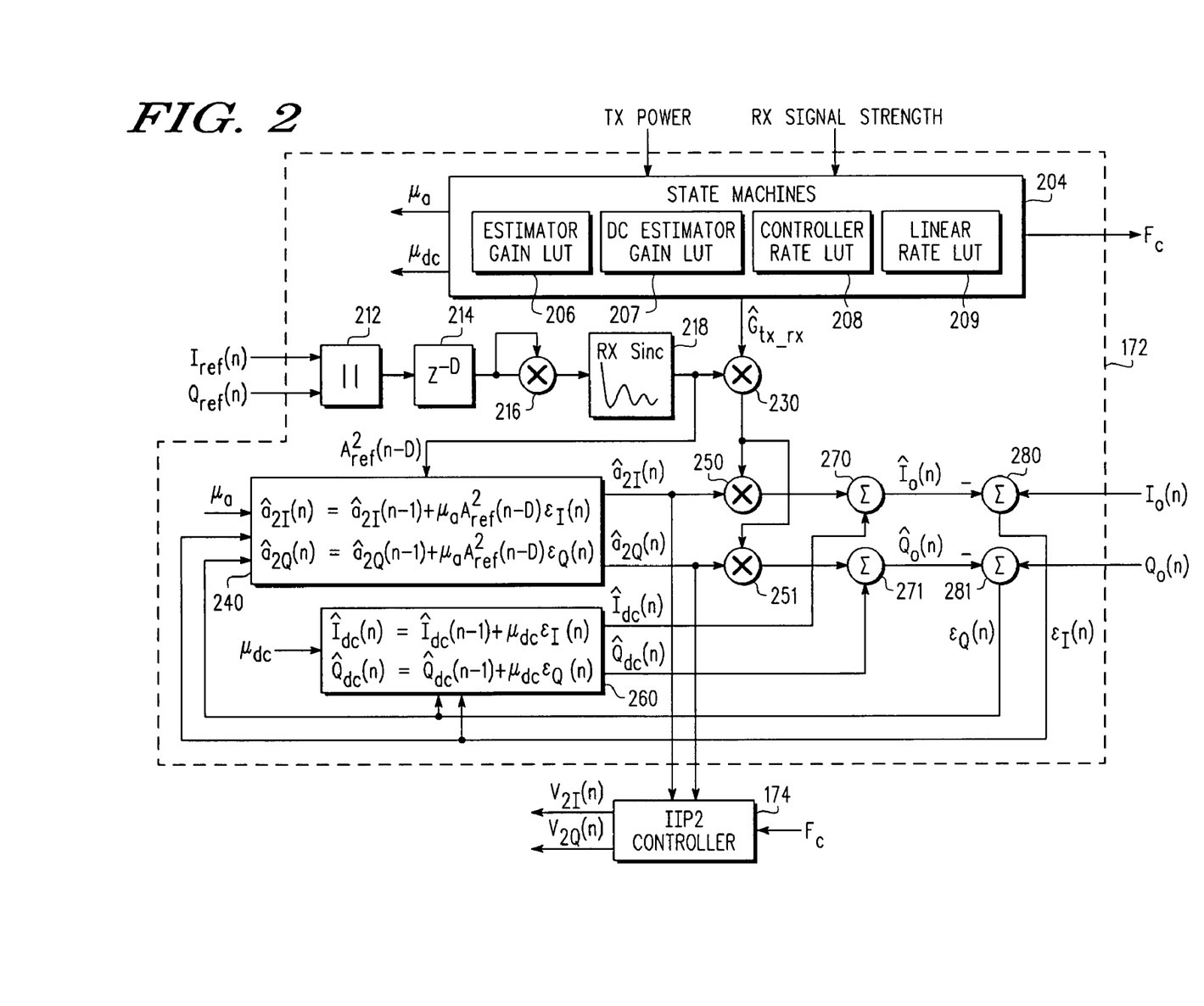
FIG. 2 is a functional block diagram of the estimator.

FIG. 2 is a functional block diagram of the estimator 172. The estimator 172 distinguishes between the amount of the transmit signal that may fall into the receive band (at baseband) in the receiver 106 due to second-order mixing, and the amount of other signals in the receive band such as the desired receive signal that falls into the receive band due to first-order mixing. The estimator 172 actively estimates the IIP2 coefficients $a_{2I}$ and $a_{2Q}$, based on the amplitude-squared signal transmitted by the transmitter 104 and a detected in-band signal received by the receiver 106. The estimator 172 includes state machines 204 which, using values of the TX_POWER signal and the RSSI signal, determine an adaptive gain (or step size) $\mu_a$ of the estimator, a gain $\mu_{dc}$ of a DC estimator 260, an adaptation (or update) rate $F_C$ of the controller 174, and a linear gain $G_{tx\_rx}$. The state machines 204 are configured, initiated and triggered, and then they run autonomously. The estimator 172 includes an estimator gain look-up table 206, a DC estimator gain look-up table 207, a controller rate look-up table 208 and a linear gain look-up table 209. The values of the adaptation rate coefficient $\mu_a$ of the estimator 172, the gain $\mu_{dc}$ of the DC estimator 260, the update rate $F_C$ of the controller 174, and the linear gain $G_{tx\_rx}$ of the transceiver 102 are predetermined (during a laboratory characterization stage) and are stored in the look-up tables 206, 207, 208 and 209 in firmware. The rate of operation of the estimator 172 is, in one embodiment, sixteen (16) times the chip rate. In one embodiment, the chip rate is 3.84 MHz. The estimator 172 uses a synchronized, scaled, amplitude-squared signal transmit signal as a reference for IIP2 estimation.

The estimator 172 includes a magnitude element 212 that receives signals $I_{ref}$ and $Q_{ref}$ from the baseband portion of the transmitter 104 and that determines a magnitude $A_{ref}$ of the transmit reference signal. The signal $A_{ref}$ incurs the delay, D, at a delay element 214, and then the delayed magnitude is squared, or multiplied by itself, at a multiplier 216. The resulting signal $|A_{ref}(n-D)|^2$ is filtered by a decimation filter 218. The decimation filter 218 is used because although a WCDMA signal has a bandwidth of 5 MHz, the signal $|A_{ref}(n-D)|^2$ has a bandwidth much wider than 5 MHz. The decimation filter 218 reduces the bandwidth of the signal $A^2_{ref}(n-D)$ back to approximately 5 MHz. In one embodiment, the decimation filter 218 is a sinc filter. In another embodiment, the decimation filter 218 is a root raised cosine filter. In any event, the decimation filter 218 is of a same type of filter as the decimation filter 152 in the receiver 106. In addition, if the analog filter 148 or any other filters in the receiver 106 shape $|A_{ref}(n-D)|^2$, i.e., the squared version of the transmitted signal, then the decimation filter 218 should have a response that is a composite of all filters in the receiver that impact the bandwidth of the signal $|A_{ref}(n-D)|^2$. It is insufficient to model the decimation filter 152 by its latency alone. When the estimator 172 is used with the embodiment of the receiver 106 that includes a sinc filter as the decimation filter 152, it is necessary to model, in the estimator, the sinc effect on the amplitude squared of the transmit reference signal; therefore, in such case, the estimator 172 includes a sinc filter 218 as its decimation filter 218. The signal $|A_{ref}(n-D)|^2$ outputted by the decimation filter 218 is fed into update equations 240 where it is multiplied with $\epsilon_I$ and $\epsilon_Q$. Separately, the signal $|A_{ref}(n-D)|^2$ is also fed into a multiplier 230 where it is multiplied with the linear gain $G_{tx\_rx}$ outputted by one of the state machines 204. Therefore, the output of the multiplier 230 is $G_{tx\_rx}|A_{ref}(n-D)|^2$.

The estimator 172 determines an amount of second-order intermodulation distortion in the receiver 106 by estimating a value of $a_2$ using update equations 240, as follows:

$$\hat{a}_{2I}(n)=\hat{a}_{2I}(n-1)+\mu_a A_{ref}^2(n-D)\epsilon_I(n) \quad (25)$$

$$\hat{a}_{2Q}(n)=\hat{a}_{2Q}(n-1)+\mu_a A_{ref}^2(n-D)\epsilon_Q(n) \quad (26)$$

The update equations 240 may start blindly with arbitrary initial values for the estimated $\hat{a}_{2I}$ and the estimated $\hat{a}_{2Q}$. Alternatively, the update equations 240 may start with better initial values for the estimated $\hat{a}_{2I}$ and the estimated $\hat{a}_{2Q}$ that are based on a priori knowledge of the range of IIP2 values of the mixer to be tuned. For example, if it is known that the IIP2 of a given mixer is in the range of 30-60 dBm, one could set an initial value of $\hat{a}_2$ to the value that corresponds to an IIP2 of 30 dBm. Inputs to the update equations 240 include the signal $|A_{ref}(n-D)|$, error signals, $\epsilon_I$ and $\epsilon_Q$, and the signal $\mu_a$. Error signal $\epsilon_I$ is the difference between a desired signal $I_o$ and an estimated signal $\hat{I}_o$. Error signal $\epsilon_Q$ is the difference between a desired signal $Q_o$ and an estimated signal $\hat{Q}_o$. At occurrence of each update, each update equation 240 outputs an estimated value of $a_2$, which are $\hat{a}_{2I}(n)$ and $\hat{a}_{2Q}(n)$. The estimator 172 includes multipliers 250 and 251 that multiplies $\hat{a}_{2I}(n)$ and $\hat{a}_{2Q}(n)$, respectively, with the signal $G_{tx\_rx}|A_{ref}(n-D)|^2$. It can be shown that the I-channel IMD2 is proportional to $\hat{a}_{2I}(n)G_{tx\_rx}|A_{ref}(n-D)|^2$, and that the Q-channel IMD2 is proportional to $\hat{a}_{2Q}(n)G_{tx\_rx}|A_{ref}(n-D)|^2$.

In one embodiment, a least mean squares (LMS) based optimization algorithm is used in the estimator 172 to estimate the IIP2 coefficient. In another embodiment, a sign-sign LMS-based algorithm is used in the estimator 172, in which case the values of the terms $\mu A_{ref}^2(n-D)\epsilon_I(n)$ in the update equations 240 are replaced by their signs. In still other embodiments, one of a gradient search algorithm, a signed error algorithm, and a recursive least squares algorithm is used in the estimator 172. In yet another embodiment, a cross correlator is used in the estimator 172. A modified sign-sign LMS-based algorithm is used in the controller 174.

Figure 3:
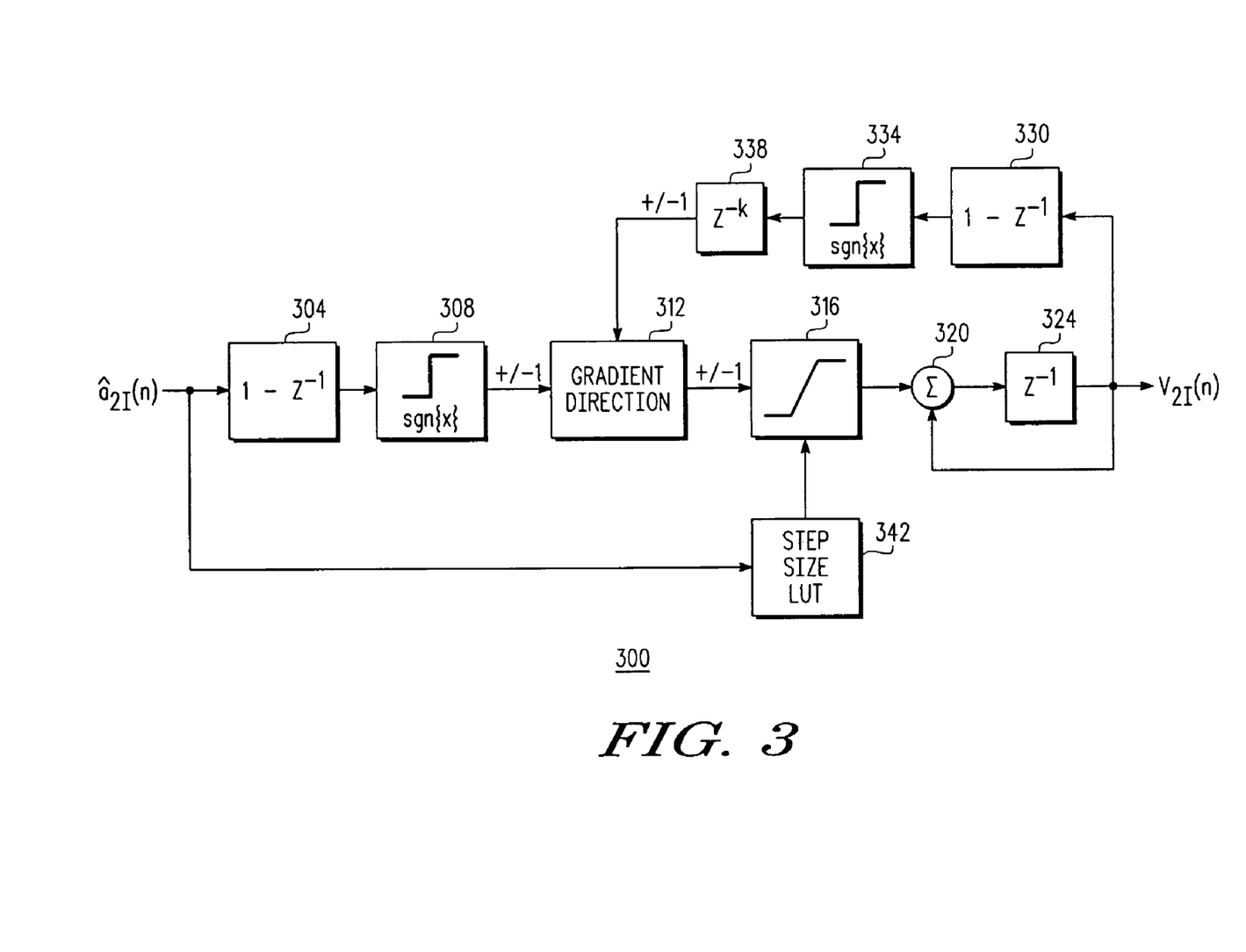
FIG. 3 is a functional block diagram of the controller.

The transmit-to-receive gain of the transceiver 102 can change, by multiple decibels, from transceiver to transceiver and from frequency band to frequency band. Therefore, the version of the sign-sign LMS-based algorithm used in the controller 174 uses a variable step size depending on the magnitude of $\hat{a}_2$. The variable step size advantageously desensitizes the transient performance of the controller 174 from variations in the transmit-to-receive gain. If the controller 174 were sensitive to such gain variations, then the transient, or settling time, of the loop would be highly variable.

The selection of a step size of the controller 174 is based on the IIP2 estimation to desensitize the transient or convergence behavior of the controller from system loop gain variation. Otherwise, variation in isolation by the duplexer 108, for example, could hamper the tracking performance of the calibration system 170. The gain of the estimator 172 and the update rate of the controller 174 are automatically adjusted based on the $P_{OUT}$ of the transmitter 104 and the received signal strength of the receiver 106, so as to maximize the signal-to-noise ratio (SNR) and tracking performance of the calibration algorithm. Depending on the embodiment, the update equations 240 are implemented with hardware, firmware or software.

The estimator 172 includes an on-line, adaptive DC estimator 260 (hereinafter "DC estimator") that removes any non-IIP2 DC components from the signals being estimated by the estimator 172, thereby mitigating any degrading of the estimation of the IIP2 coefficients $a_{2I}$ and $a_{2Q}$ caused by such non-IIP2 DC components. In another embodiment, the IIP2 estimation algorithm runs such that $I_{dc}$ and $Q_{dc}$ contain all the DC in $I_o$ and $Q_o$, including the DC due to IIP2 products, thereby allowing the estimator 172 to remove all the DC components from the signals being estimated. In this other embodiment, the signal $|A_{ref}(n-D)|^2$ at the output of the decimation filter 218 is further filtered with a high pass filter (not shown) such that the DC component of the signal $|A_{ref}(n-D)|^2$ is removed. This further filtering allows $I_{dc}$ and $Q_{dc}$ to be used by the DC estimator 260 to estimate all DC contributions in $I_o$ and $Q_o$.

In one embodiment, the DC estimator 260 uses an LMS-based algorithm, and performs the following $I_{dc}$ and $Q_{dc}$ update equations:

$$\hat{I}_{dc}(n)=\hat{I}_{dc}(n-1)+\mu_{dc}\epsilon_I(n) \quad (27)$$

$$\hat{Q}_{dc}(n)=\hat{Q}_{dc}(n-1)\mu_{dc}\epsilon_Q(n) \quad (28)$$

Depending on the embodiment, the preceding $I_{dc}$ and $Q_{dc}$ update equations are implemented with hardware, firmware or software. Adaptive DC correction is employed to remove any non-IIP2 DC components to more accurately measure the IIP2.

The receiver 106 includes a DC offset correction circuit (not shown), or a coarse DC offset correction circuit and fine DC offset correction circuit (not shown), which correct for all DC offsets. The coarse DC offset correction algorithm measures a coarse estimate of DC offset due to the analog portion of the receiver 106, as this is typically run during cold calibration without a transmit signal present. The fine DC offset correction circuit runs during normal receive operation to correct all additional DC (residual DC offset remaining after the coarse DC offset correction circuit, and DC due to IMD2 effects). When the transmitter power is below a certain threshold, the DC measured by the fine DC offset will be only the residual DC of the analog portion. The fine DC offset can be used to aid in the estimation of the initial values of $I_{dc}$ and $Q_{dc}$ in the DC estimator 260.

The DC estimator 260 may start blindly with arbitrary initial values for the estimated $I_{dc}$ and the estimated $Q_{dc}$. Alternatively, the DC estimator 260 may start with better initial values for the estimated $I_{dc}$ and the estimated $Q_{dc}$ that are based on a priori knowledge of the DC offset of the analog portion of the receiver 106. By "better" it is meant that the initial values for the estimated $I_{dc}$ and the estimated $Q_{dc}$ are closer in value to the values of $I_{dc}$ and $Q_{dc}$ than are arbitrary initial values. In one embodiment, where a coarse DC offset is being applied in the analog portion, one could use the residual DC offset as a starting point (where the residual DC offset is due to the DAC size for the coarse DC steps). Because the DC offset of the analog portion changes as a function of the AGC gain, this information can be used to initiate a new DC offset measurement, instead of waiting X microseconds (see step 401 of FIG. 4). Inputs to the DC estimator 260 include error signals, $\epsilon_I$ and $\epsilon_Q$, and a signal $\mu_{dc}$, which is a gain of the DC estimate update equations. The variable $\mu_{dc}$ defines a step size for the DC estimate. The magnitude of the step size $\mu_{dc}$ is variably changed. Alternatively, for an initial $I_{dc}(n)$ and $Q_{dc}(n)$, the magnitude of the step size $\mu_{dc}$ is loaded into the DC estimate update equations because the value of the residual non-IMD2 DC term will likely be known from the coarse DC offset correction setting and the fine DC offset corrections setting. The step size $\mu_{dc}$ could be made larger after an AGC step for a few updates, m, because an AGC change will result in larger residual DC in the receiver 106. When the AGC changes, the amount of DC seen by the DC estimator 260 may change, thus it would be beneficial to initially have a coarser step size $\mu_{dc}$, then adjust it to a finer step size $\mu_{dc}$. This improves the overall tracking performance of the DC estimation algorithm. Outputs from the DC estimator 260 comprise the signals $\hat{I}_{dc}$ and $\hat{Q}_{dc}$, which are feed into adder 270 and 271, respectively, where they are added to the signals $\hat{a}_{2I}\hat{G}_{tx-rx}|A_{ref}(n-D)|^2$ and $\hat{a}_{2Q}\hat{Q}_{tx-rx}|A_{ref}(n-D)|^2$, respectively. Therefore, the output signal from adder 270 is $\hat{a}_{2I}\hat{G}_{tx-rx}|A_{ref}(n-D)|^2+\hat{I}_{dc}$, and the output signal from adder 271 is $\hat{a}_{2Q}\hat{G}_{tx-rx}|A_{ref}(n-D)|^2+\hat{Q}_{dc}$. The signals $\hat{I}_{dc}$ and $\hat{Q}_{dc}$ are estimates of the non-IIP2 DC components of $I_o(n)$ and $Q_o(n)$, respectively. The output signal from each of adder 270 and 271 is fed into adder 280 and 281, respectively, where it is subtracted from $I_o(n)$ and $Q_o(n)$, respectively, to obtain error signals, $\epsilon_I$ and $\epsilon_Q$, respectively.

A firmware-based supervisor algorithm (see FIG. 4) configures the estimator 172 and the controller 174 for optimal convergence, based on the transmit power level and the received signal strength. The larger the transmit power with respect to the received signal strength, the more accurate and faster is the performance of the calibration system 170 and vice versa. The estimator 172 has a gain, or adaptation rate coefficient $\mu_a$, that can be set to trade off convergence with respect to noise rejection. The larger the transmit power with respect to the received signal strength, the larger $\mu_a$ can be set and vice versa. The transmit signal acts as a signal, and the desired receive signal acts as noise, as far as the estimator 172 is concerned. Therefore, a decrease in transmit $P_{out}$ degrades the SNR of the algorithm, and an increase in received signal strength also degrades the SNR of the algorithm. As the SNR increases, $\mu_a$ is increased to accelerate convergence. Conversely, as the SNR reduces, $\mu_a$ is decreased to average out the effect of increased noise on the estimator 172. Similarly, the update rate $F_C$ of the controller 174 is programmed with respect to the SNR. As the SNR reduces, the update rate $F_C$ is reduced (i.e., the controller runs slower), and vice versa. One of the state machines 204 sets the $G_{tx\_rx}$, based on the transmit power level and the received signal strength.

The calibration algorithm of the estimator 172 estimates a baseband component of a received signal that is correlated with the amplitude squared of a transmit signal. The estimate is proportional to the cross correlation between the receive in-band signal and the amplitude squared of the transmit signal. All other sources (e.g., receive signal, blockers, . . . ) appear as uncorrelated noise. The calibration algorithm of the controller 174 adjusts the D/A converters 176 and 178 to minimize the IIP2 component in the receiver 106 caused by the signal transmitted by the transmitter 104.

The controller 174 tunes the IIP2 port of the mixers 140 and 141 to maximize the IIP2 of the receiver 106. The step sizes are based on the IIP2 estimation. The controller 174 implements a search algorithm that finds an optimum setting of $v_2$ that minimizes $a_2$. In one embodiment, the search algorithm that the controller 174 employs is an approximation of the LMS algorithm. In another embodiment, the search algorithm that the controller 174 employs is a steepest descent algorithm.

Figure 8:
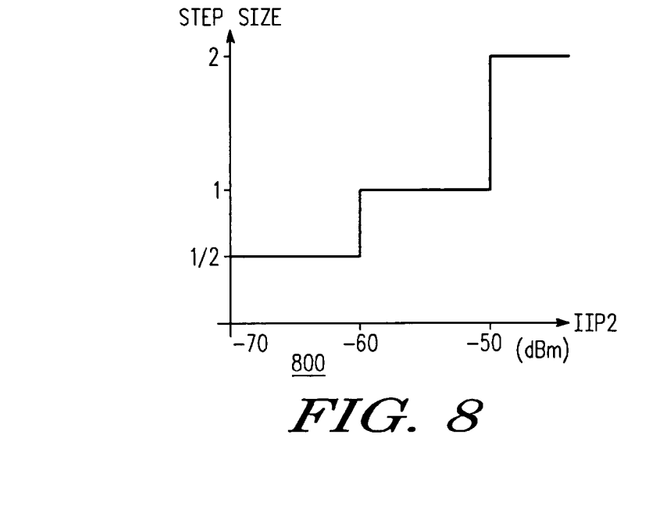
FIG. 8 is a chart of step size versus IIP2.

The LMS algorithm to minimize $a_2$ with respect to $v_2$ can be described as follows:

$$v_2(n) = v_2(n-1) - \mu_c \frac{\partial a_2}{\partial v_2} a_2 \quad (29)$$

where $\mu_c$ is the gain of the controller 174. FIG. 8 is a chart of step size versus IIP2. Upon substituting an estimate of $\hat{a}_2$ for the actual $a_2$, equation (29) becomes:

$$v_2(n) = v_2(n-1) - \mu_c \frac{\partial \hat{a}_2}{\partial v_2} \hat{a}_2 \quad (30)$$

A first order numerical approximation of the LMS gradient can be expressed as follows, with k being the latency between $v_2$ and $a_2$:

$$\frac{\partial \hat{a}_2}{\partial v_2} \cong \frac{\hat{a}_2(n) - \hat{a}_2(n-1)}{v_2(n-k) - v_2(n-1-k)} \quad (31)$$

The sign, alone, of the gradient can be used in the controller 174 rather than the sign and a value of the gradient, which avoids division and reduces complexity, but which preserves the directional information of gradient. If the sign, alone, of the gradient is used, then equation (31) can be further approximated as follows:

$$\frac{\partial \hat{a}_2}{\partial v_2} \approx \text{sgn}\{\hat{a}_2(n) - \hat{a}_2(n-1)\}\text{sgn}\{v_2(n-k) - v_2(n-1-k)\} \quad (32)$$

Equation (32) can be substituted into equation (30). Equation (30) then becomes:

$$v_2(n)=v_2(n-1)-\mu_c\{\text{sgn}\{\hat{a}_2(n)-\hat{a}_2(n-1)\}\text{sgn}\{v_2(n-k)-v_2(n-1-k)\}\}\hat{a}_2 \quad (33)$$

Figure 5:
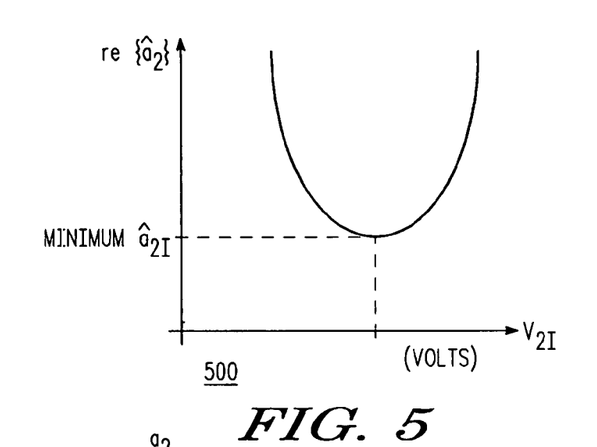
FIG. 5 is a chart of an IIP2 coefficient for a real component of a received signal versus voltage of an I-channel digital-to-analog converter.

FIG. 5 is a chart of an IIP2 coefficient for a real component of a received signal versus voltage of an I-channel D/A converter 176.

Figure 6:
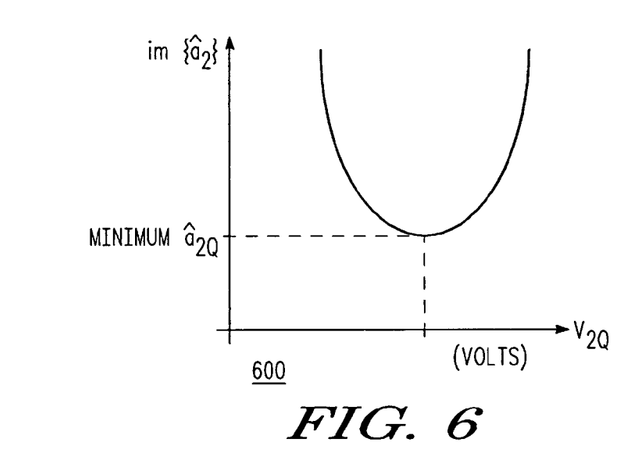
FIG. 6 is a chart of an IIP2 coefficient for an imaginary component of a received signal versus voltage of a Q-channel digital-to-analog converter.

FIG. 6 is a chart of an IIP2 coefficient for an imaginary component of a received signal versus voltage of a Q-channel D/A converter 178. In general, the shape of the curve in FIG. 5 is different from the shape of the curve in FIG. 6. Accordingly, the minimum $\hat{a}_{2I}$ and its corresponding $v_{2I}$ for the I-channel shown in FIG. 5 are different from the minimum $\hat{a}_{2Q}$ and its corresponding $v_{2Q}$ for the Q-channel shown in FIG. 6.

Figure 7:
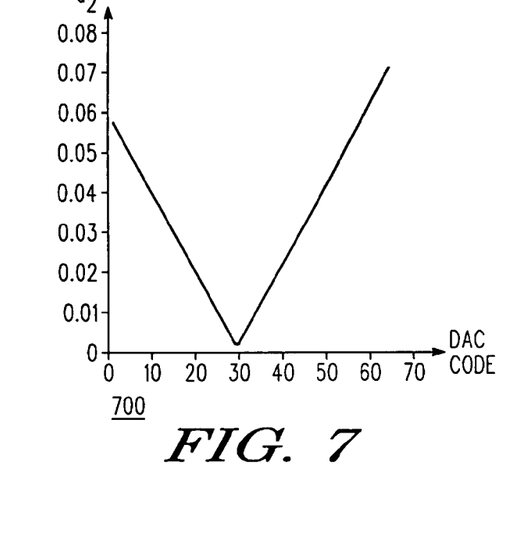
FIG. 7 is a chart of the IIP2 coefficient versus a code outputted by one of the I-channel and the Q-channel digital-to-analog converters.

FIG. 7 is a chart of a cost function, or the IIP2 coefficient versus a code outputted by one of the I-channel D/A converter 176 and the Q-channel D/A converter 178. The controller 174 selects a code that produces a lowest $a_2$.

FIG. 8 is a chart of an exemplary embodiment of step size versus IIP2. For the exemplary embodiment shown in FIG. 8, the gained estimate of $a_2$ in equation (33), i.e., $\mu_c \hat{a}_2$, can have one of the values ½, 1 and 2, depending on the value of $a_2$, the value of $a_2$ being proportional to IIP2. For example, if the value of the IIP2 is less than −60 dBm, the step size is ½; if the value of the IIP2 is greater than −50 dBm, the step size is 2; otherwise, the step size is 1. Alternatively, a 10 dB margin of error could be added to the value of the IIP2 to ensure enough margin for temperature variations. When the TX_POWER is weak and the RSSI is strong or interferences are strong, it may not be beneficial to run the calibration algorithm. Having an additional margin ensures that during the periods that the calibration algorithm is not running, the receiver 106 still has an excellent IIP2. The use of a nonlinear, sign-sign variation of the LMS algorithm in the controller 174 advantageously makes the closed loop dynamics less sensitive to variations in gain.

Alternatively, the gained estimate of $a_2$ in equation (33), i.e., $\mu_c \hat{a}_2$, can be replaced by its sign, i.e., $\text{sgn}\{\mu_c \hat{a}_2\}$. This replacement means that the controller 174 has no gain.

$$\mu_c \hat{a}_2 \rightarrow \text{sgn}\{\mu_c \hat{a}_2\} = 1 \tag{34}$$

This replacement allows the algorithm to be desensitized from variations in the linear gain, $G_{tx\_rx}$, particularly variations in the amount transmitter-receiver isolation afforded by the duplexer 108. With this replacement, no multipliers or gain stages are required in the controller 174.

Alternatively, $$\mu_c \hat{a}_2 \rightarrow \text{sgn}\{\mu_c \hat{a}_2\} = C \tag{34a}$$

where the gain C could be derived from a step size look-up table 342 in which the value of C is a function of a present value of $\hat{a}_2$.

Equation (34a) can be substituted into equation (33). Equation (33) then becomes:

$$v_2(n) = v_2(n-1) - C\, \text{sgn}\{\hat{a}_2(n) - \hat{a}_2(n-1)\} \text{sgn}\{v_2(n-k) - v_2(n-1-k)\} \tag{35}$$

where k represents a delay, measured in number of samples, for a reaction to occur in $\hat{a}_{2I}$ and $\hat{a}_{2Q}$ after a change in $v_{2I}$ and $v_{2Q}$, respectively. The presence of the k term assures that $v_{2I}$ and $\hat{v}_{2Q}$ is proper aligned with $\hat{a}_{2I}$ and $\hat{a}_{2Q}$, respectively. It takes a certain amount of time, after changing $v_{2I}$ and $v_{2Q}$, to update the D/A converters 176 and 178, and for a new IMD2 to be passed through analog and digital portions of the receiver 106 and into the estimator 172 updating $\hat{a}_{2I}$ and $\hat{a}_{2Q}$ and finally passing these estimates into the IIP2 algorithm of the controller 174. If the delay in the I-channel is different from the delay in the Q-channel, the value k can be replaced with $k_I$ and $k_Q$, respectively. This delay mismatch could be the result of I/Q mismatches of the analog filters 148. If these delays are different, one must make sure that $v_{2I}$ and $v_{2Q}$ are always updated at the same instant regardless of when the new estimates of $\hat{a}_{2I}$ and $\hat{a}_{2Q}$ are ready. Alternatively, to ensure that $v_{2I}$ and $v_{2Q}$ are updated at the same instant, one can choose the larger of $k_I$ and $k_Q$ and use it for both $v_{2I}$ and $v_{2Q}$.

The controller 174 comprises an I-channel controller 300 and a Q-channel controller. The I-channel controller 300 and the Q-channel controller operate independently of each other. FIG. 3 illustrates a functional block diagram of the I-channel controller 300. A functional block diagram of Q-channel controller is not shown because it is substantial similar to I-channel controller 300.

The I-channel controller 300 operates at a rate of $F_C$. The I-channel controller 300 receives values of $\hat{a}_{2I}$ from the estimator 172 at a rate equal to the rate of operation of the estimator. Usually, the rate of operation $F_C$ of the controller 174 is less than or equal to the rate of operation of the estimator 172. In one embodiment of a 3G transceiver, the rate of operation $F_C$ of the controller 174 is two (2) to thirty-two (32) times the chip rate. $F_C$ is a function of the data rate, and, for the long term evolution (LTE) standard, the data rate can be smaller or larger, i.e., the data rate is a function of the symbol/bit/chip rate. A value of $\hat{a}_{2I}$ is fed into a differentiator 304, where a difference between a present value of $\hat{a}_{2I}$ and a previous value $\hat{a}_{2I}$ is performed, i.e., $\hat{a}_{2I}(n) - \hat{a}_{2I}(n-1)$. Alternatively, a true derivative is performed at the differentiator 304. The output from the differentiator 304 is fed into a sign element 308, the output of which is defined as $$\text{sgn}\{\hat{a}_{2I}(n) - \hat{a}_{2I}(n-1)\} \tag{36}$$

The output of the sign element 308 can be theoretically one of −1, 0 and +1. However, the output of the sign element 308 is almost certainly either +1 or −1. It is unlikely that the output of the sign element 308 be zero because noise is always present.

The output $v_2(n)$ is fed back into a differentiator 330, where a difference between a present value of $v_{2I}$ and a previous value $v_{2I}$ is performed, i.e., $v_{2I}(n) - v_{2I}(n-1)$. The output from the differentiator 330 is fed into a sign element 334, the output of which is defined as $$\text{sgn}\{v_{2I}(n) - v_{2I}(n-1)\} \tag{37}$$

However, for the sign element 334, the operation $\text{sgn}\{0\}$ is defined as being equal to the value 1, to avoid stalling on start-up of the controller 174. Therefore, the output of the sign element 334 is always either +1 or −1. The output of the sign element 334 is fed into a delay element 338 that delays the signal by k samples. The output of the delay element 338 is defined as $$\text{sgn}\{v_2(n-k) - v_2(n-1-k)\} \tag{38}$$

Equation (36) and equation (38) are multiplied at the gradient direction element 312. The output of the gradient direction element 312 is defined as $$\text{sgn}\{\hat{a}_{2I}(n) - \hat{a}_{2I}(n-1)\} * \text{sgn}\{v_2(n-k) - v_2(n-1-k)\} \tag{39}$$

The output of the gradient direction element 312 is the gradient direction of the change in $a_2$ with respect to a change in $v_2$. The gradient direction is one of −1, 0 and +1. The gradient direction is based a combination $\{\hat{a}_{2I}, v_{2I}\}$ that consists of the sign of the derivative of the $\hat{a}_{2I}$ and the sign of the derivative of the $v_{2I}$. The output of the gradient direction element 312 is as follows:

If $\{-1, -1\}$ or $\{1, 1\}$ then the gradient direction is −1.

Else if $\{+1, -1\}$ or $\{-1, +1\}$ then the gradient direction is +1.

Otherwise, the gradient direction is 0, i.e., $\text{sgn}\{\Delta \hat{a}_{2I}\} = 0$.

The output of the gradient direction element 312, which is either +1 or −1, is fed into a dynamic step size limiter 316. The dynamic step size limiter 316 ensures stability. The controller includes a step size look-up table 342 in which are stored a plurality of values of $a_{2I}$ and associated step sizes C (for example, −2, −1, −0.5, +0.5, 1, 2). The step size C reduces as $\hat{a}_2$ diminishes. As well, one could control the step size as a function of the output of the gradient direction element 312. Once the output of the gradient direction element 312 switches between +1 and −1 on consecutive updates, the algorithm of the controller 174 is getting closer to the minima (or, most likely, has passed the minima). When the this occurs, the step size can be reduced. The step size could be a function of the integral of the output of the gradient direction element 312. As the integral of the output of the gradient direction element 312 goes to zero, the step size could be decreased. At the dynamic step size limiter 316, the step size C from the step size look-up table 342 and the gradient direction from the gradient direction element 312 are combined and outputted to an adder 320. The value and sign of the output from the dynamic step size limiter 316 determine which direction and by what amount to change, or step, the next setting of $v_2$. At the adder 320, the previous value of $v_2(n)$ is updated by the output from the dynamic step size limiter 316, to produce $v_2(n+1)$, i.e., $v_2(n+1)=v_2(n)\pm C$. At a delay element 324, $v_2(n+1)$ is delayed by one sample, thereby becoming $v_2(n)$. The bottom input to the adder 320 (i.e., output of the delay element 324) is $v_{2I}(n)$. The output of the adder 320 is $v_{2I}(n+1)$. The input to the delay element 324 is $v_{2I}(n+1)$.

Figure 4:
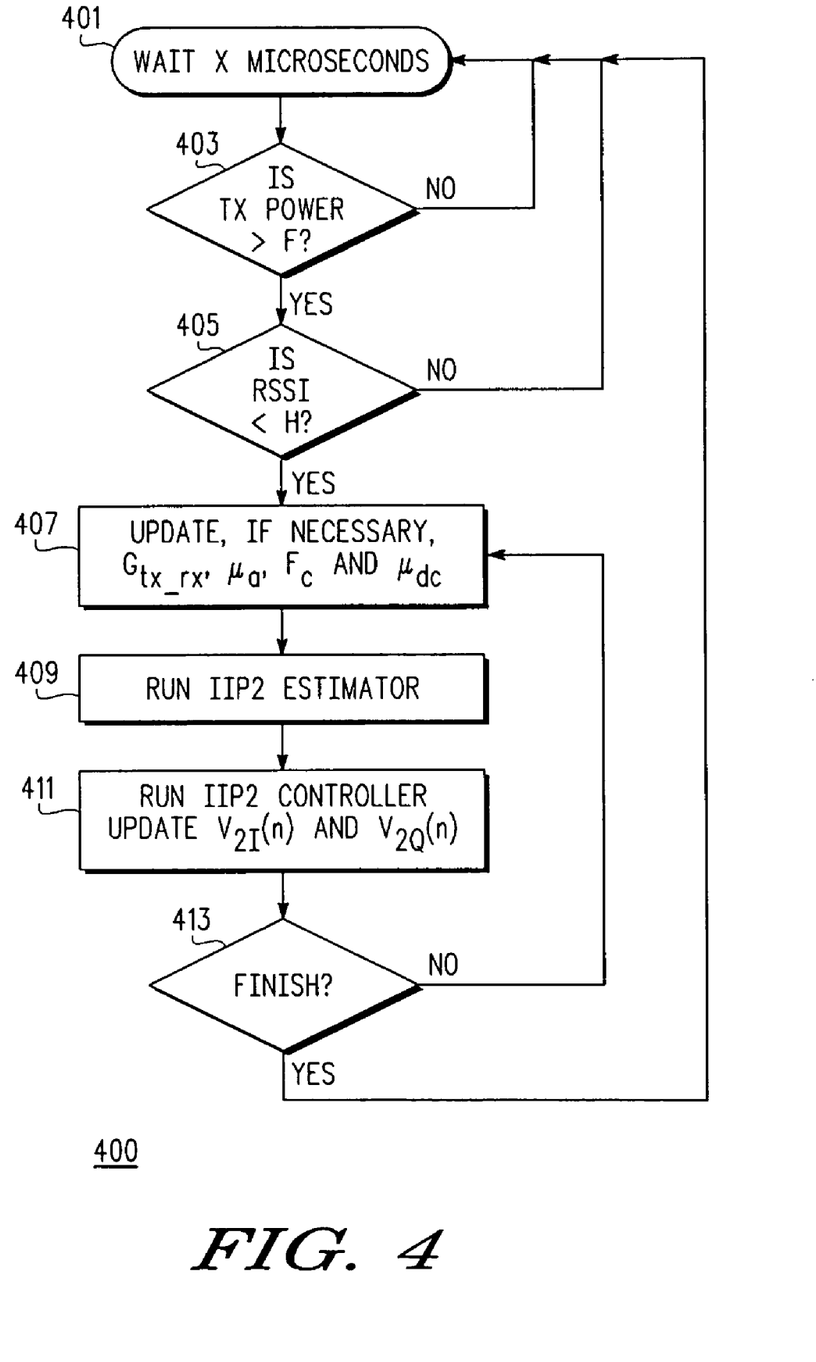
FIG. 4 is a flow diagram illustrating operation of IIP2 calibration system.

FIG. 4 is a flow diagram 400 illustrating operation of the calibration system 170. The method of operation of the calibration system 170 estimates the IIP2 coefficient, and minimizes the IIP2 estimation. The method of operation of the calibration system 170 starts at step 401. At step 403, a determination is made whether TX_POWER is greater than a predetermined level F. If it is not, the method returns to step 401. If it is, the method proceeds to step 405. At step 405, a determination is made whether RSSI is less than a predetermined level H. If it is, the method proceeds to step 407. If it is not, the method returns to step 401 and waits a predetermined period of X microseconds for a change to occur in the level of one or both of the TX_POWER and the RSSI. In addition, any change in the AGC settings, the RSSI, or the TX_POWER could initiate an update by the estimator 172. At step 407, state machines 204 determine whether a change in one or more of $G_{tx\_rx}$, $\mu_a$, $F_C$ and $\mu_{dc}$ is required, based upon the present level of TX_POWER and RSSI, and any such required change is made. At step 409, the estimator 172 operates, which estimates values of $\hat{a}_{2I}(n)$ and $\hat{a}_{2Q}(n)$. At step 411, the controller 174 operates, which minimizes $V_{2I}(n)$ and $V_{2Q}(n)$, thereby minimizing IIP2 in the receiver 106. At step 413, the flow returns to step 401.

Maximum SNR means that the transmitter $P_{OUT}$ is 24 dBm at receive sensitivity and that there are no in-band blockers. As the SNR decreases, the adaptive gain $\mu_a$ of the estimator 172 is turned down proportionally and the adaptation (or update) rate $F_C$ of the controller 174 is decreased proportionally. As the SNR decreases, the IIP2 becomes less critical; however, it is still desirable to be able to track out temperature drift of the IIP2.

As the transmit power reduces, the performance of the calibration system 170 becomes less critical. The gain $\mu_a$ of the estimator 172 is automatically scaled with $P_{OUT}$ via $G_{tx\_rx}$ isolation gain setting (i.e., set via firmware as a function of $P_{OUT}$ and received signal strength). A lower gain $\mu_a$ of the estimator 172 increases settling or latency of the estimator, which, in the limit, leads to instability. The adaptation (or update) rate $F_C$ of the controller 174 is reduced to facilitate reduction in the gain $\mu_a$ of the estimator 172.

As received signal strength increases above sensitivity, the performance of the calibration system 170 becomes less critical. As the received signal strength increases, the adaptive gain $\mu_a$ and the adaptation (or update) rate $F_C$ are turned down. The adaptation (or update) rate $F_C$ of the controller 174 becomes progressively slower as received signal strength increases. For a high enough received signal strength, the calibration algorithm is essentially stalled or turned off.

The desired receive signal and in-band blockers act as uncorrelated "noise" sources. The larger the power of the desired receive signal plus the in-band blockers is, the smaller is the SNR recognized by the estimation algorithm. The "linear" residual baseband component dominates SNR recognized by the estimation algorithm.

As the signal strength of the desired signal plus any in-band blocker increases, the gain $\mu_a$ of the estimator 172 is reduced to maintain a required level of noise rejection. The rate $F_C$ of the controller 174 is reduced to maintain overall stability of the calibration algorithm. As transmit power reduces, the $G_{tx\_rx}$ of the calibration algorithm decreases proportionally and the adaptation (or update) rate $F_C$ of the controller 174 (the rate of the calibration algorithm) is decreased, to maintain loop stability. As transmit power decreases below a predetermined level and/or as the received signal strength increases above a predetermined level, adaptation is essentially off.

As the transmit-receive isolation of the duplexer 108 increases above its specified minimum, $G_{tx\_rx}$ decreases proportionately at a 2:1 rate. For every 1 dB increase in the transmit-receive isolation provided by the duplexer 108, $G_{tx\_rx}$ decreases by 2 dB. Without knowing what the reduction in isolation is, any such reduction results in slower convergence of the estimator 172 and a 2:1 proportional reduction in the $a_2$ estimate. The controller 174 is designed without any gain terms to desensitize it from such gain variations. For every 1 dB increase in gain before the mixer 140 and 141, the IMD2 will increase by 2 dB.

The calibration system 170 is effective at any SNR; however, the calibration system is most effective when the receiver 106 is at sensitivity and the transmitter 104 is at maximum power out, $P_{OUT}$. The calibration system 170 maximizes IIP2 performance when the receiver 106 is at sensitivity (i.e., attempting to receive a signal at approximately −106.7 dBm), and when the transmitter 104 is at maximum $P_{OUT}$ and the transmit signal detrimentally leaking into the receiver, which, after attenuation by the duplexer 108, is at approximately −25 dBm (i.e., several orders of magnitude stronger than the receive signal). If the SNR at the estimator 172 is sufficient at the maximum IIP2, then the calibration system 170 tunes to that point. Therefore, although the SNR will not be best when the transmitter 104 is not at maximum power, the calibration system 170 still can tune to the optimal IIP2.

The calibration system 170 optimizes IIP2 performance to allow the receiver 106 to satisfy the linearity requirement of third generation (3G) Universal Mobile Telecommunications System (UMTS) receivers.

The calibration system 170 may include a processor (not shown), operatively coupled to the estimator 172 and to the controller 174, which controls some of or all the operation of the calibration system 170. It should be understood that all circuitry described herein may be implemented either in silicon or another semiconductor material or alternatively by software code representation of silicon or another semiconductor material.

In one embodiment, the transceiver 102 and the calibration system 170 are disposed on an integrated circuit fabricated using a deep dual-oxide, complementary metal oxide semiconductor (CMOS) process.

Although the invention is described herein with reference to specific embodiments, various modifications and changes can be made without departing from the scope of the present invention as set forth in the claims below. For instance, although the exemplary embodiments show that the invention is used with a direct-conversion 3G receiver 106 that lacks both an LNA and a SAW filter, the invention is usable in a direct-conversion 3G receiver that includes one of, or both, an LNA and a SAW filter. Furthermore, the invention is not limited to use with a direct-conversion 3G receiver; the invention is usable in any type of receiver. Although the exemplary embodiments show that the calibration system 170 is used with a transceiver 102 that uses spread-spectrum RF modulation, the invention is usable with a transceiver that uses any of various other RF modulations in which the transmitter 104 transmits at the same moment as the receiver 106 receives. Although the exemplary embodiments show that the calibration system 170 is used with the WCDMA protocol, the invention is usable with other types of protocols. Although the exemplary embodiment of the transceiver 102 operates in one or more frequency bands in a range between approximately 800 MHz and approximately 2 GHz, the invention is also usable with a transceiver 102 that operates in one or more frequency bands outside of that range. Although the exemplary embodiments show that the calibration system 170 is used to tune the second-order intercept point (IP2) to reduce second-order intermodulation distortion (IMD2), the invention also applies to any higher order intercept point (IPn) and a corresponding higher order intermodulation distortion product (IMDn), where n is an even integer. Although in one exemplary embodiment, the transceiver 102 and the calibration system 170 are disposed on an integrated circuit fabricated using CMOS technology; the invention can also be used with an integrated circuit fabricated using other technologies.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radio frequency transceiver, comprising:
   a duplexer;
   a transmitter coupled to the duplexer;
   a receiver including a mixer, coupled to the duplexer, wherein the receiver receives a leaked signal comprising a transmit RF signal leaked through the duplexer; and
   a calibration system, the calibration system including
      an estimator, coupled to the transmitter and to the receiver, for calculating an estimate of second-order intermodulation distortion in the receiver as a result of second-order intermodulation distortion occurring in the mixer, wherein the estimator uses a live transmit signal from the transmitter as reference signal, and
      a controller, coupled to the estimator, for adjusting an input-related, second-order intercept (IIP2) point tuning port of the mixer, based on the estimate of second-order intermodulation distortion in the receiver, to reduce second-order intermodulation distortion in the receiver.

2. The radio frequency transceiver of claim 1, wherein the estimator eliminates direct current from a baseband receive signal, while calculating the estimate of second-order intermodulation distortion.

3. The radio frequency transceiver of claim 2, including state machines for configuring the estimator and the controller, the configuring being based on a power output of the transmitter and a received signal strength of the receiver.

4. The radio frequency transceiver of claim 3, wherein a state machine sets a gain of the estimator and a rate of the controller, based on a ratio of transmit power of the transmitter to detected received signal strength of the receiver.

5. The radio frequency transceiver of claim 4, wherein the controller uses a sign-sign least means squared optimization algorithm to estimate IIP2 coefficients.

6. The radio frequency transceiver of claim 5, wherein the sign-sign least means squared optimization algorithm has a variable step size, the variable step size depending on magnitudes of the estimates of the IIP2 coefficients.

7. The radio frequency transceiver of claim 6, wherein the receiver is a direct-conversion receiver.

8. The radio frequency transceiver of claim 7, wherein the transmitter transmits simultaneously as the direct-conversion receiver receives.

9. A radio frequency transceiver, comprising:
   a duplexer;
   a transmitter coupled to the duplexer;
   a direct-conversion receiver including a mixer, coupled to the duplexer, wherein the receiver receives a leaked signal comprising a transmit RF signal leaked through the duplexer;
   circuitry that determines a transmit power output of the transmitter;
   circuitry that determines a received signal strength indication of the receiver;
   circuitry that determines a linear gain between baseband of the transmitter and baseband of the receiver; and
   a calibration system, including
      circuitry, coupled to baseband of the transmitter, that determines a filtered, delayed, amplitude squared version of a baseband transmit signal,
      circuitry that multiplies the filtered, delayed, amplitude squared version of a baseband transmit signal with the linear gain to produce a first signal,
      circuitry that compares the first signal with a baseband receive signal that includes a second-order intermodulation distortion product produced in the mixer from the leaked signal, wherein the circuitry that compares uses a version of a sign-sign least means squared optimization algorithm for estimating a value of an input-related, second-order intercept (IIP2) coefficient that is proportional to the second-order intermodulation distortion product produced in the mixer, and
      circuitry that produces, in response to results from the optimization algorithm, a tuning voltage for tuning an IIP2 port of the mixer to reduce the second-order intermodulation distortion occurring in the mixer.

10. The radio frequency transceiver of claim 9, wherein the transmitter transmits simultaneously as the direct-conversion receiver receives.

11. The radio frequency transceiver of claim 10, wherein the calibration system includes circuitry that compensates for any DC offset in the baseband receive signal while the calibration system compares the first signal with a baseband receive signal, to reduce degradation of the estimation by the presence of the DC offset.

12. The radio frequency transceiver of claim 11, wherein the circuitry that compensates uses a sign-sign least means squared optimization algorithm to estimate the IIP2 coefficient.

13. The radio frequency transceiver of claim 12, wherein the sign-sign least means squared optimization algorithm has a variable step size, the variable step size depending on a magnitude of the IIP2 coefficient estimation.

14. The radio frequency transceiver of claim 10, wherein the calibration system includes circuitry that compensates only for a certain type of DC offset in the baseband receive signal while comparing the first signal with a baseband receive signal to reduce degradation of the estimation by the presence of the DC offset, the certain type of DC offset being the type of DC offset caused by effects other than second-order intermodulation distortion in the mixer.

15. The radio frequency transceiver of claim 10, in which the radio frequency transceiver is implemented in an integrated circuit.

* * * * *

UNITED STATES PATENT AND TRADEMARK OFFICE
CERTIFICATE OF CORRECTION

PATENT NO. : 8,060,043 B2  
APPLICATION NO. : 12/248421  
DATED : November 15, 2011  
INVENTOR(S) : Patrick Pratt Page 1 of 1

It is certified that error appears in the above-identified patent and that said Letters Patent is hereby corrected as shown below:

On the Title Page:  
Item (57) ABSTRACT:

In Line 8, delete "distortion";

In the Claims:

Col. 17, in claim 1, line 53:

change "intercept (IIP2) point" to --intercept point (IIP2)--;

Col. 18, in claim 9, line 29:

change "baseband" to --a baseband portion--; and

Col. 18, in claim 9, line 41:

change "intercept (IIP2)" to --intercept point (IIP2)--.

Signed and Sealed this  
Twenty-seventh Day of December, 2011

David J. Kappos  
*Director of the United States Patent and Trademark Office*